United States Patent
Chuang

(10) Patent No.: US 7,661,757 B2
(45) Date of Patent: Feb. 16, 2010

(54) BICYCLE SADDLE

(76) Inventor: Louis Chuang, 8$^{th}$ Floor-4, No. 20, Ta Lon Road, Taichung (TW)

( * ) Notice: Subject to any disclaimer, the term of this patent is extended or adjusted under 35 U.S.C. 154(b) by 44 days.

(21) Appl. No.: 11/937,558

(22) Filed: Nov. 9, 2007

(65) Prior Publication Data
US 2008/0197680 A1  Aug. 21, 2008

(30) Foreign Application Priority Data
Feb. 16, 2007  (TW) .............................. 96106326 A

(51) Int. Cl.
*B60J 1/00* (2006.01)
(52) U.S. Cl. .................. 297/214; 297/202; 297/219.11
(58) Field of Classification Search ............ 297/195.1, 297/195.11, 201, 202, 200, 214, 219.11
See application file for complete search history.

(56) References Cited

U.S. PATENT DOCUMENTS

| | | | |
|---|---|---|---|
| 629,956 A | 8/1899 | Craig | 297/201 |
| 694,875 A | 3/1902 | Meighan | 297/201 |
| 823,916 A | 6/1906 | Brooks et al. | 297/207 |
| 3,997,214 A * | 12/1976 | Jacobs | 297/214 |
| 4,063,775 A | 12/1977 | Mesinger | 297/201 |
| 4,429,915 A * | 2/1984 | Flager | 297/199 |
| 4,512,608 A | 4/1985 | Erani | 297/201 |
| 4,877,286 A | 10/1989 | Hobson et al. | 297/195 |
| 5,147,685 A * | 9/1992 | Hanson | 428/189 |
| 5,203,607 A * | 4/1993 | Landi | 297/214 |
| 5,286,082 A | 2/1994 | Hanson | 297/201 |
| 5,330,249 A * | 7/1994 | Weber et al. | 297/214 |
| 5,348,369 A * | 9/1994 | Yu | 297/214 |
| 5,676,420 A | 10/1997 | Kuipers et al. | 297/204 |
| 5,823,618 A | 10/1998 | Fox | 297/201 |
| 5,911,475 A * | 6/1999 | Nakahara | 297/219.11 |
| 5,921,624 A | 7/1999 | Wu | 297/215.14 |
| 6,106,059 A | 8/2000 | Minkow et al. | 297/202 |
| 6,176,546 B1 * | 1/2001 | Andrews | 297/195.1 |
| 6,402,236 B1 | 6/2002 | Yates | 297/201 |
| 6,450,572 B1 | 9/2002 | Kuipers | 297/195.1 |
| 6,666,507 B1 * | 12/2003 | Ringgard | 297/195.1 |
| 6,752,453 B1 | 6/2004 | Yapp | 297/215.14 |

(Continued)

OTHER PUBLICATIONS

Chinese Patent Publication No. CN 2262520 Y, Sep. 17, 1997, 6 pages.

(Continued)

*Primary Examiner*—David Dunn
*Assistant Examiner*—Erika Garrett
(74) *Attorney, Agent, or Firm*—Alan Kamrath; Kamrath & Associates PA

(57) ABSTRACT

A bicycle saddle includes a frame including an upper side on which first and second paddings are mounted and an under side on which a suspension rail is mounted for mounting the bicycle saddle on a bicycle. The frame further includes a compartment defined between the first and second paddings. An elastic element is received in the compartment and includes side edges which form edges of the bicycle saddle. A cover snugly fitted over the first and second paddings and the elastic element includes two spaces, whereby when a rider's pelvis bears on the bicycle saddle, the sides edges of the elastic element can extend outward of the spaces, respectively, for reducing pressure against the rider's pelvis.

11 Claims, 19 Drawing Sheets

U.S. PATENT DOCUMENTS

| | | | |
|---|---|---|---|
| 6,886,887 B2 | 5/2005 | Yu | 297/214 |
| 7,178,869 B2 | 2/2007 | Ljubich | 297/201 |
| 2002/0096917 A1 | 7/2002 | Turudich | 297/202 |
| 2004/0004375 A1 | 1/2004 | Garland et al. | 297/204 |
| 2004/0056519 A1 | 3/2004 | Kastarlak | 297/195.1 |
| 2007/0108808 A1* | 5/2007 | Chuang | 297/195.1 |
| 2007/0176472 A1 | 8/2007 | Chuang | 297/202 |

OTHER PUBLICATIONS

Chinese Patent Publication No. CN 2499308 Y, Jul. 10, 2002, 9 pages.

Chinese Patent Publication No. CN2523668Y, Dec. 4, 2002, 15 pages.

European Patent Publication No. EP1394025 A1, Mar. 3, 2004, 14 pages.

Chinese Patent Publication No. CN 1629030 A, Jun. 22, 2005, 13 pages.

Sandra Blakeslee, Your Bicycle Seat May Affect Your Love Life, Newspaper, Oct. 4, 2005, The New York Times, U.S.

* cited by examiner

BICYCLE SADDLE

BACKGROUND OF THE INVENTION

1. Field of the Invention

The present invention relates to a bicycle saddle and, more particularly, to a saddle that effectively supports a rider's external genital and thereby reduces the pressure placed on the perineum.

2. Description of the Related Art

Bicycle saddles, for many years, have been causing discomfort to the genital areas of the bicycle riders.

An article, entitled "Serious Riders, Your Bicycle Seat May Affect Your Love Life" by Sandra Blakeslee on Oct. 4, 2005, describes that cyclists, particularly men, should be careful which bicycle seats they choose. It says today's ergonomic saddles have splits in the back or holes in the center to relieve pressure on the perineum. However, this makes matters worse: the ergonomic saddles have smaller surface areas, so the rider's weight presses harder on less saddle, Dr. Schrader said. The perineum may not escape injury, because its arteries run laterally, and they are not directly over the cutouts. The arteries can come under more pressure when they come in contact with the cutout's edges. Additionally, thick gels on saddles can also increase pressure to the perineum, the studies found, because the material can migrate and form clumps in wrong places.

The present invention is, therefore, intended to obviate or at least alleviate the problems encountered in the prior art.

SUMMARY OF THE INVENTION

Accordingly, it is an objective of the present invention to provide a bicycle saddle that provides a comfortable seating to a rider and effectively reduces the pressure acting on the rider's perineum.

The bicycle saddle comprises a frame including an upper side on which first and second paddings are mounted and an under side on which a suspension rail is mounted for mounting the bicycle saddle on a bicycle. The frame further includes a compartment defined between the first and second paddings. An elastic element is received in the compartment and includes side edges which form edges of the bicycle saddle. A cover snugly fitted over the first and second paddings and the elastic element includes two spaces, whereby when a rider's pelvis bears on the bicycle saddle, the sides edges of the elastic element can extend outward of the spaces respectively for reducing pressure against the rider's pelvis.

Other objectives, advantages, and novel features of the invention will become more apparent from the following detailed description when taken in conjunction with the accompanying drawings.

DETAILED DESCRIPTION OF THE PREFERRED EMBODIMENT

Figure 1:
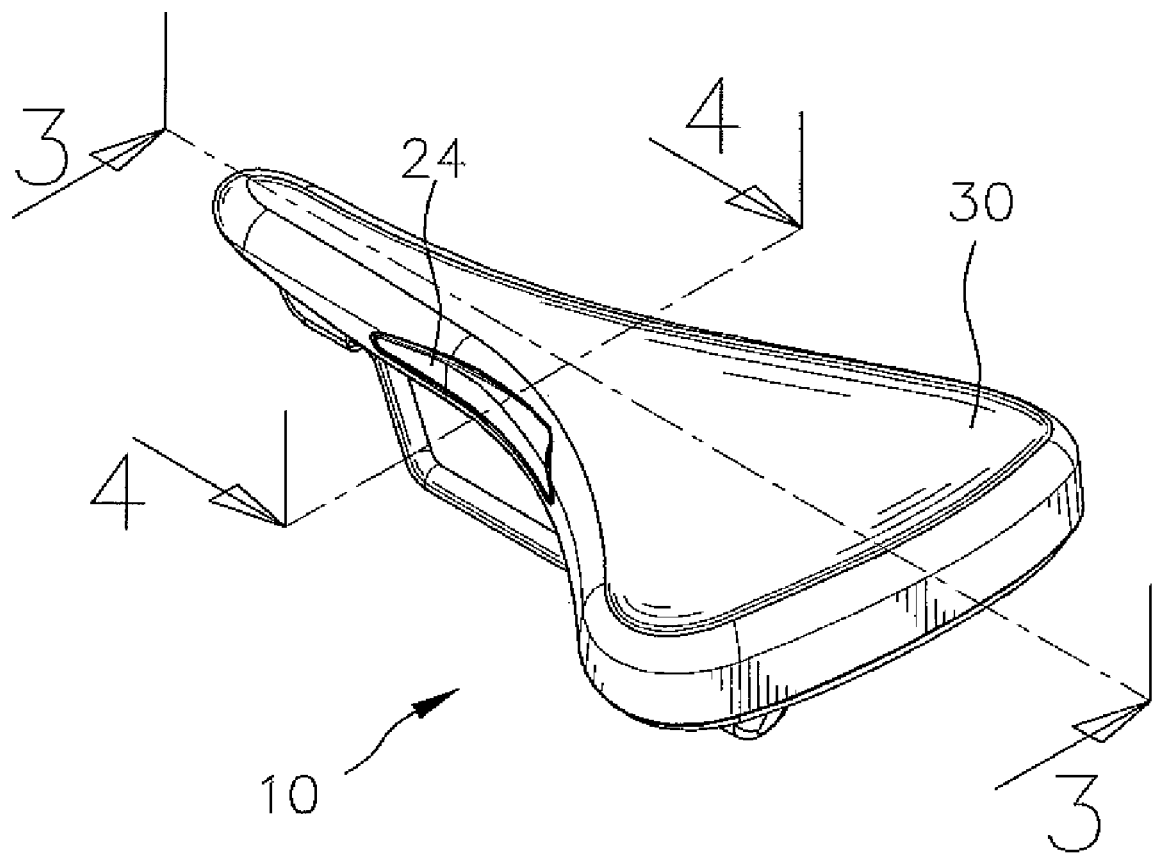
FIG. 1 is a perspective view of a bicycle saddle in accordance with a first embodiment of the present invention.
Figure 2:
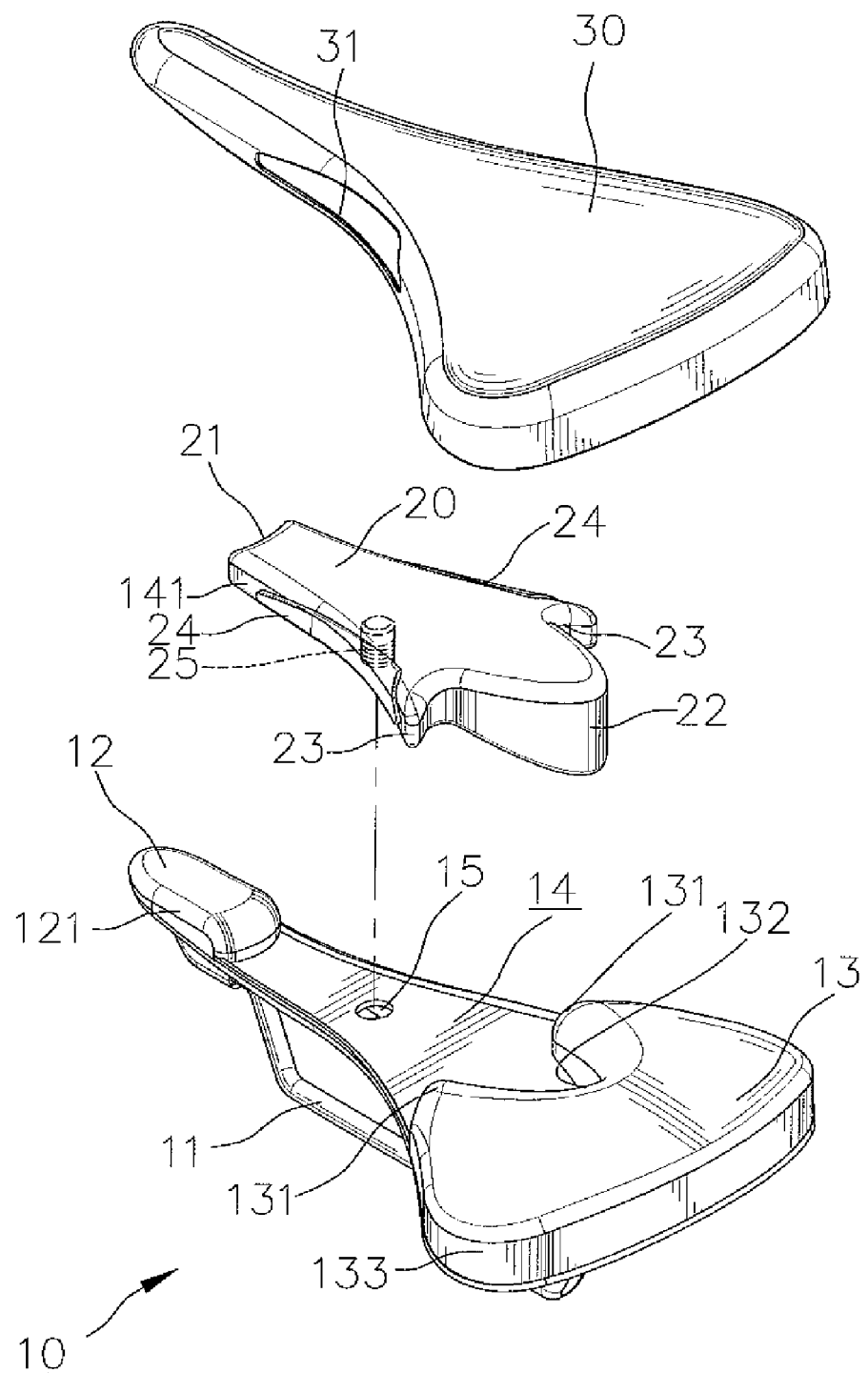
FIG. 2 is an exploded perspective view of the bicycle saddle.

Referring to FIGS. 1 and 2, a bicycle saddle in accordance with a first embodiment of the present invention comprises a frame 10, an elastic element 20 and a cover 30. The frame 10 includes an upper side on which a first padding 12 and a second padding 13 rest and an under side to which a suspension rail 11 is fixed. The suspension rail 11 is made from a piece of metal wire bent into a complex shape and is used for mounting the bicycle saddle on a bicycle. The first and second paddings 12, 13 are disposed in a spaced relation with a compartment 14 defined therebetween for receiving the elastic element 20, whereby the elastic element 20 is adapted to be secured between the first and second paddings 12, 13.

The frame 10 includes a through hole 15 extending through the upper and under sides thereof and in communication with the compartment 14. An air valve 25 is inserted into the through hole 15. The air valve 25 is attached to the elastic element 20 and can be used to connect to a pumping device (not shown) for modifying the cushioning property that the elastic element 20 provides.

As also best seen from FIG. 2, the second padding 13 includes a leading end portion having two first curved portions 131 and a second curved portion 132, two gradually tapered out side portions, and a trailing end portion. The side and trailing end portions include edges 133 each forming a portion of an edge of the bicycle saddle. Further, the first padding 12 includes first and second edges 121 each forming a portion of the edge of the bicycle saddle. Therefore, the edges 121, 133 of the first and second paddings 12 and 13 form edges of the bicycle.

The elastic element 20 includes a leading end portion 21, a trailing end portion 22 and two side edges 141 extending therebetween. The leading end portion 21 is complementy located against the first padding 12 on a portion which does not form an edge of the bicycle saddle. The trailing end portion 22 is complemently located against the second curved portion 132 of the second padding 13. The side edges of the elastic element 20 form a portion of the edge of the bicycle saddle. Additionally, in between each side edge 141 and the trailing end portion 22, there is an extension 23. The extension 23 is complemently located against the first curved portion 131 on a portion and includes a portion of the side edge 141 edge that forms the portion of the edge of the bicycle saddle. Further, each side edge 141 of the elastic element 20 includes a protuberance 24 formed thereon respectively.

Figure 3:
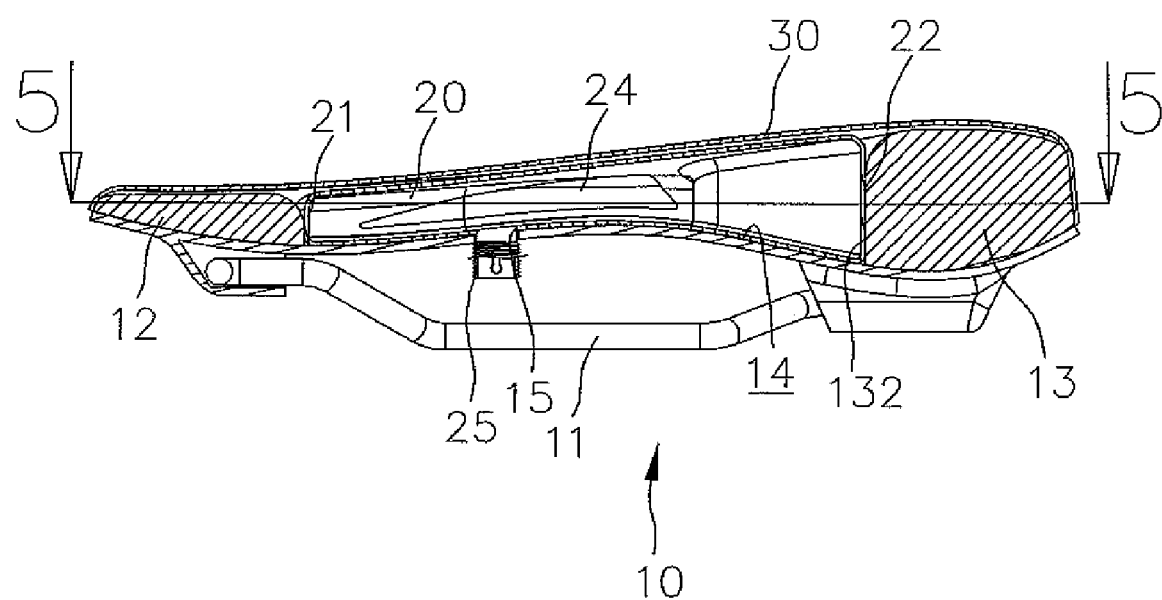
FIG. 3 is a cross-sectional view taken along line 3-3 of FIG. 1.
Figure 4:
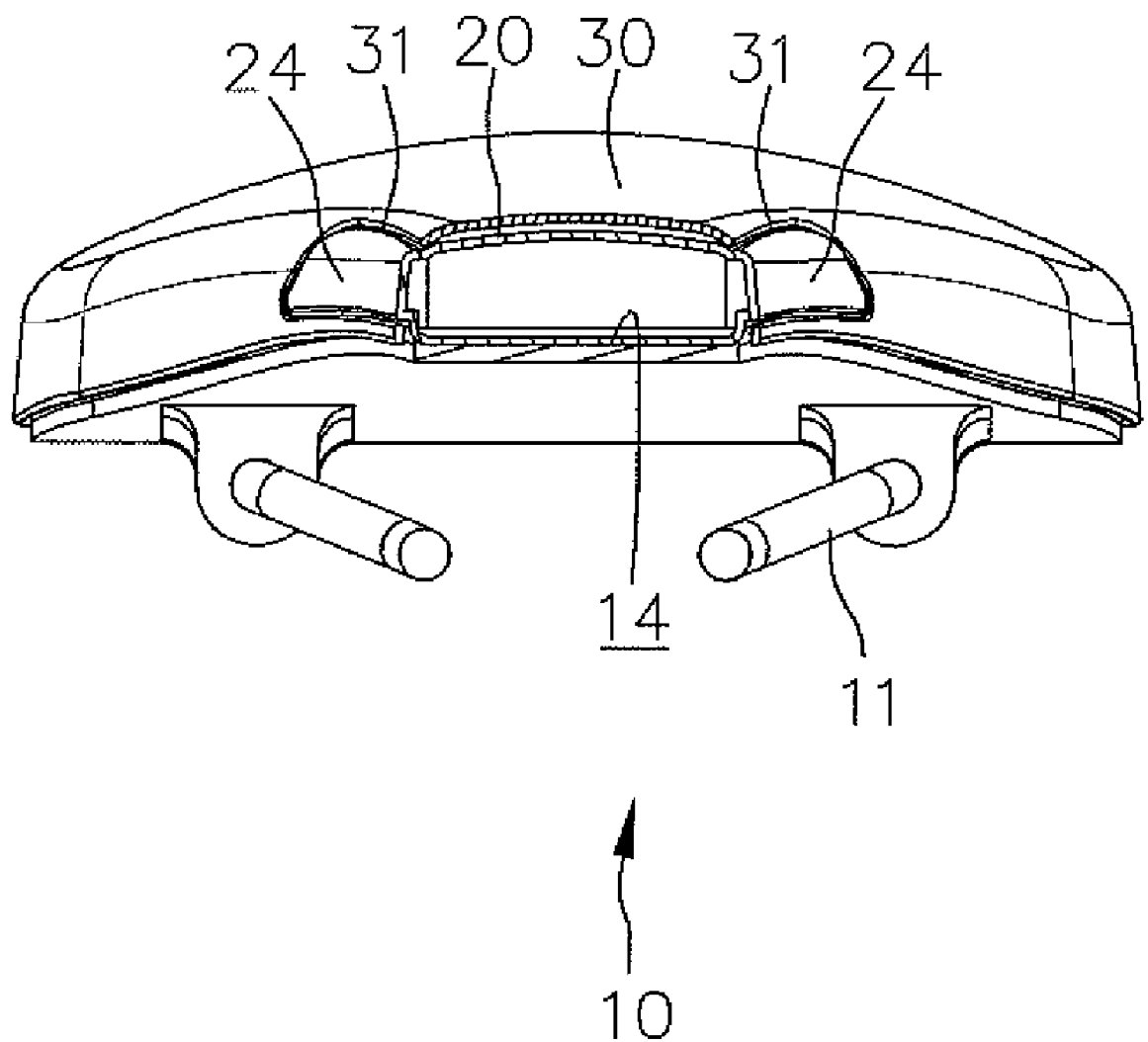
FIG. 4 is a cross-sectional view taken along line 4-4 of FIG. 1.
Figure 5:
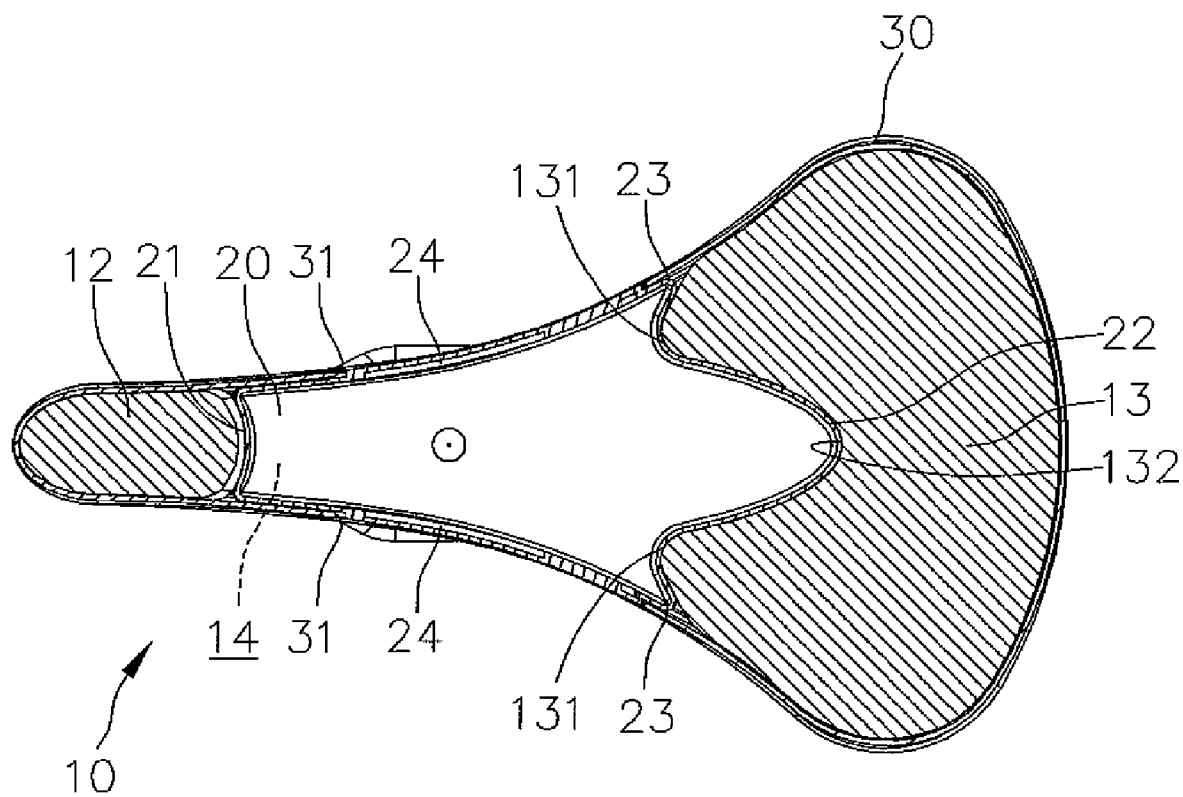
FIG. 5 is a cross-sectional view taken along line 5-5 of FIG. 3.

Referring to FIG. 3, the cover 30 is snugly fit over the first and second paddings 12, 13 and the elastic element 20. The cover 30 completely covers the first and second paddings 12, 13 and the elastic element 20 and includes two spaces 31 corresponding to the positions of the protuberances 24, respectively, such that each protuberance 24 is receivable in a corresponding space 31.

Preferably, the space 31 is a hole and has a shape the same as that of the protuberance 24.

Figure 6:
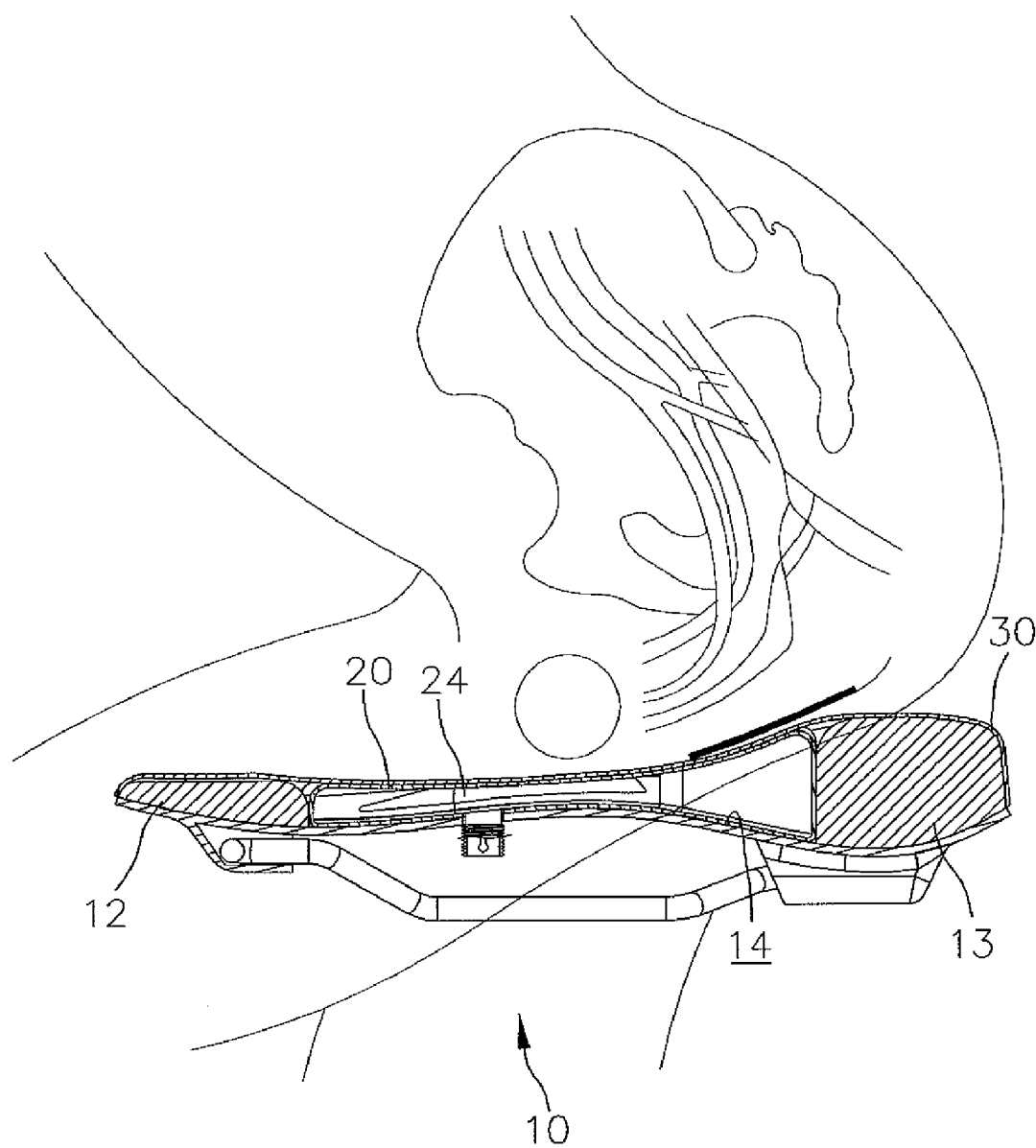
FIG. 6 shows a rider's pelvis bearing on the bicycle saddle, with the bicycle saddle deforming elastically to provide a cushion for the rider.
Figure 7:
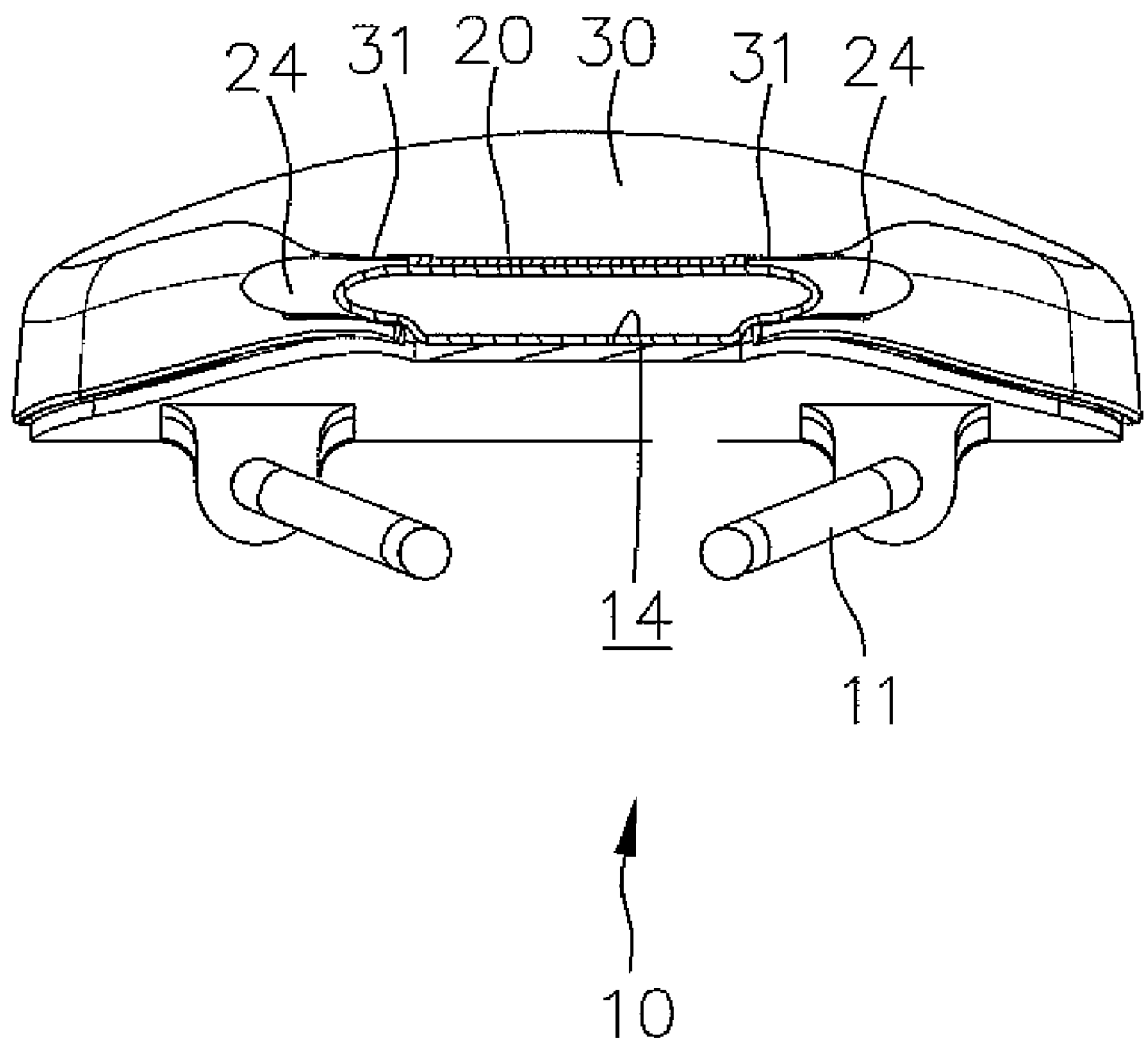
FIG. 7 is a rear view of the bicycle saddle.
Figure 8:
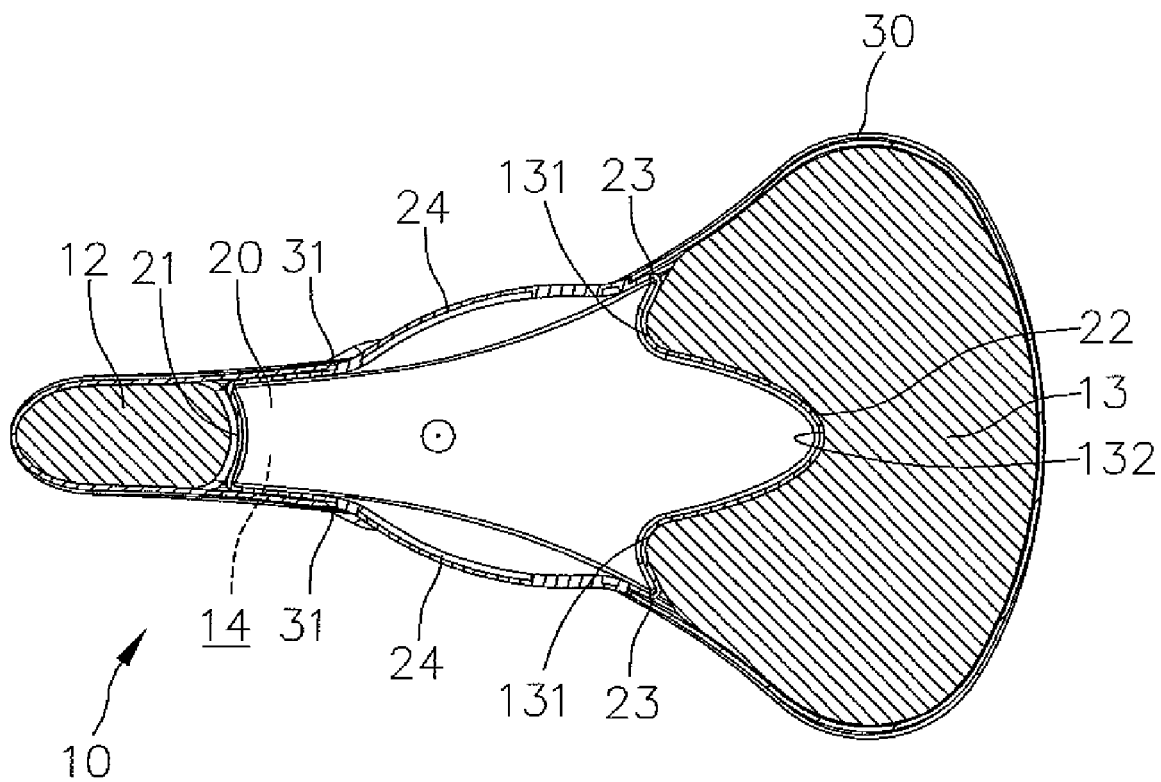
FIG. 8 is similar to FIG. 5, but with the bicycle saddle deforming elastically.
Figure 9:
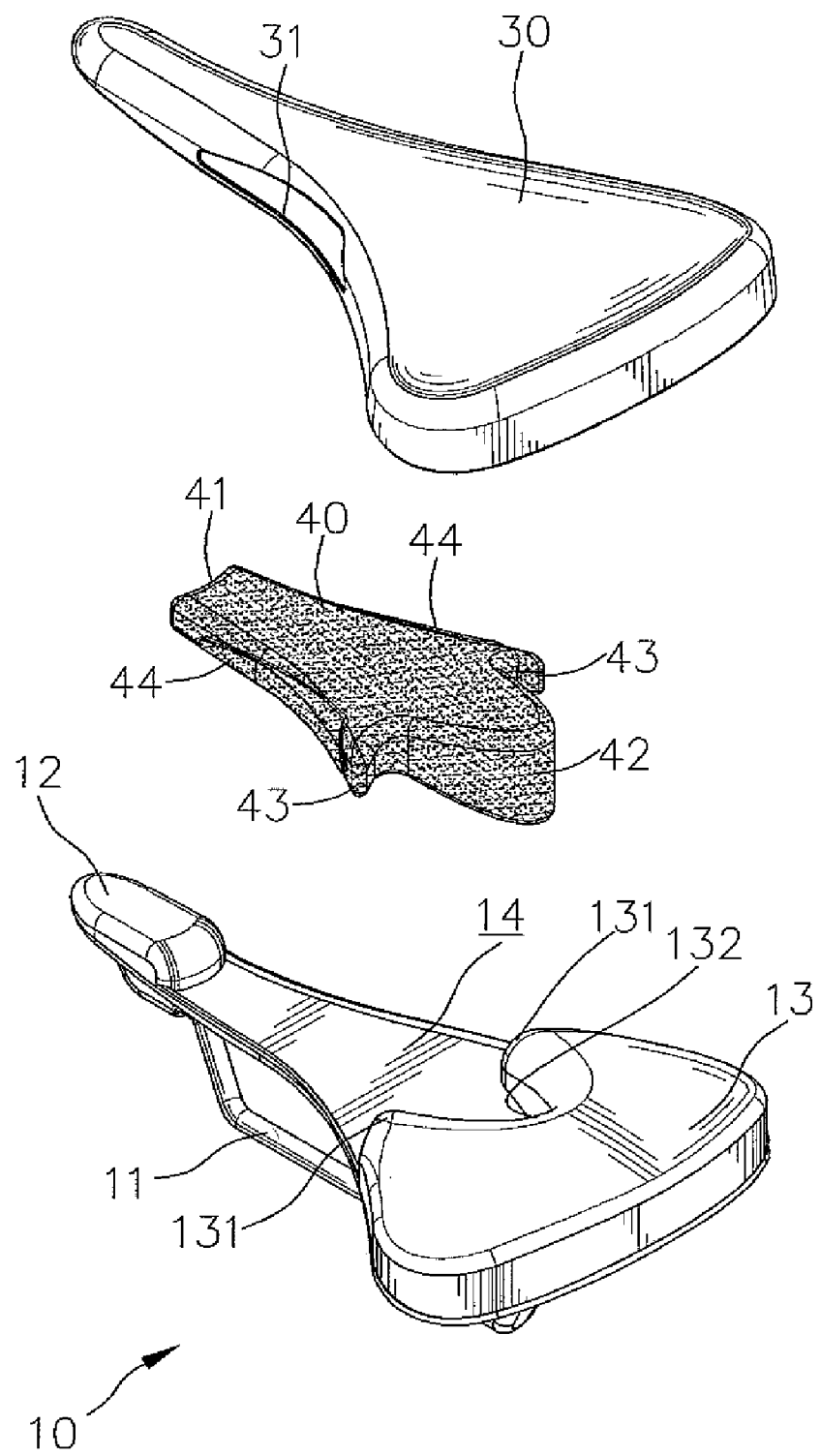
FIG. 9 is an exploded view of a bicycle saddle in accordance with a second embodiment of the present invention.
Figure 10:
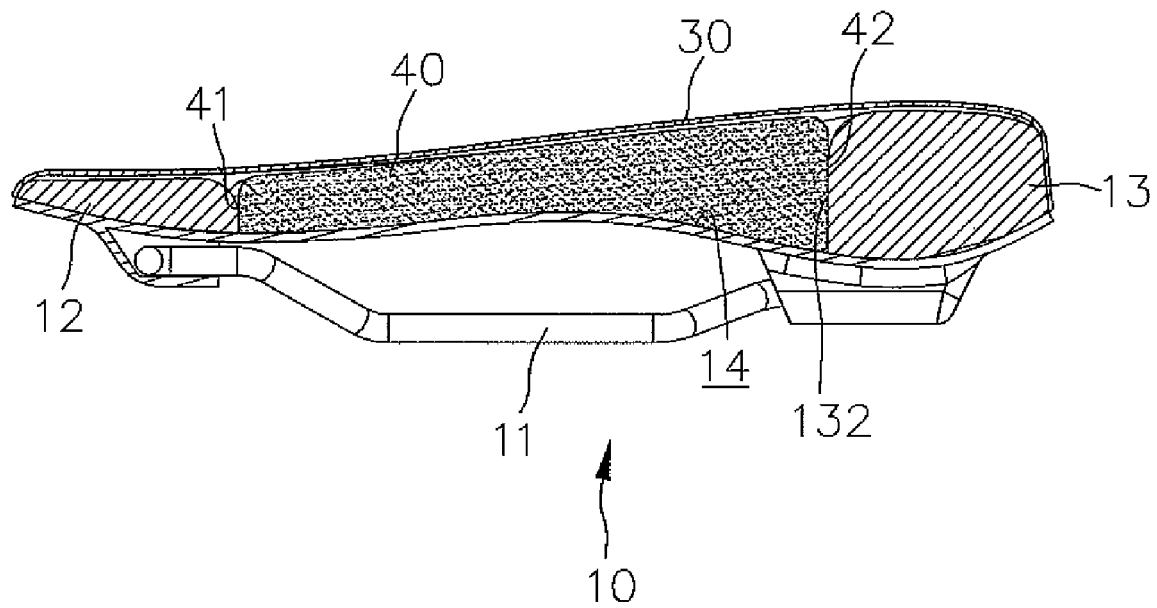
FIG. 10 is a side view of the bicycle saddle of the second embodiment.
Figure 11:
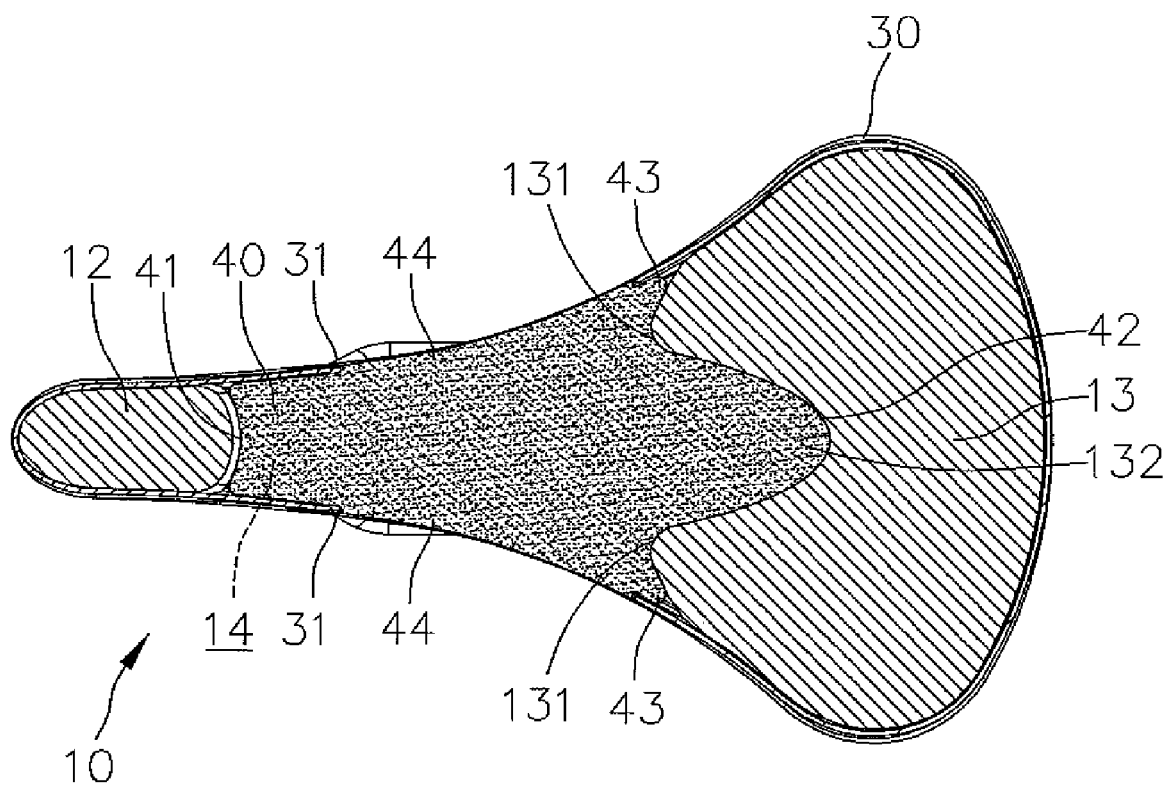
FIG. 11 is a top view of the bicycle saddle of the second embodiment.
Figure 12:
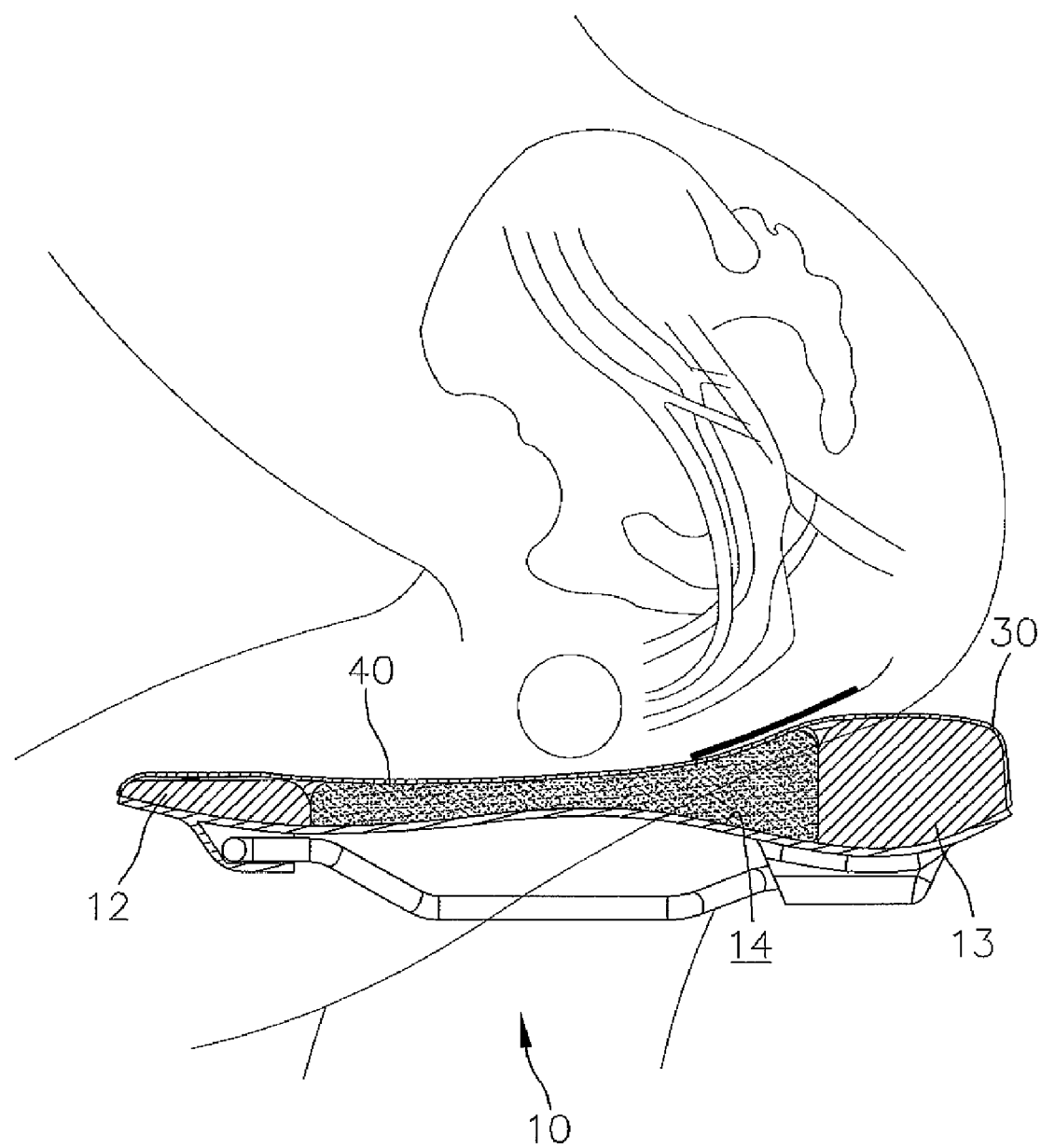
FIG. 12 shows a rider's pelvis bearing on the bicycle saddle of the second embodiment, with the bicycle saddle deforming elastically to provide a cushion for the rider.

Referring to FIG. 8 in conjunction with FIG. 6, when a rider's pelvis bears on the bicycle saddle, the protuberance 24 will extend outward from the space 31, which effectively reduces the pressure acting against the rider.

Figure 13:
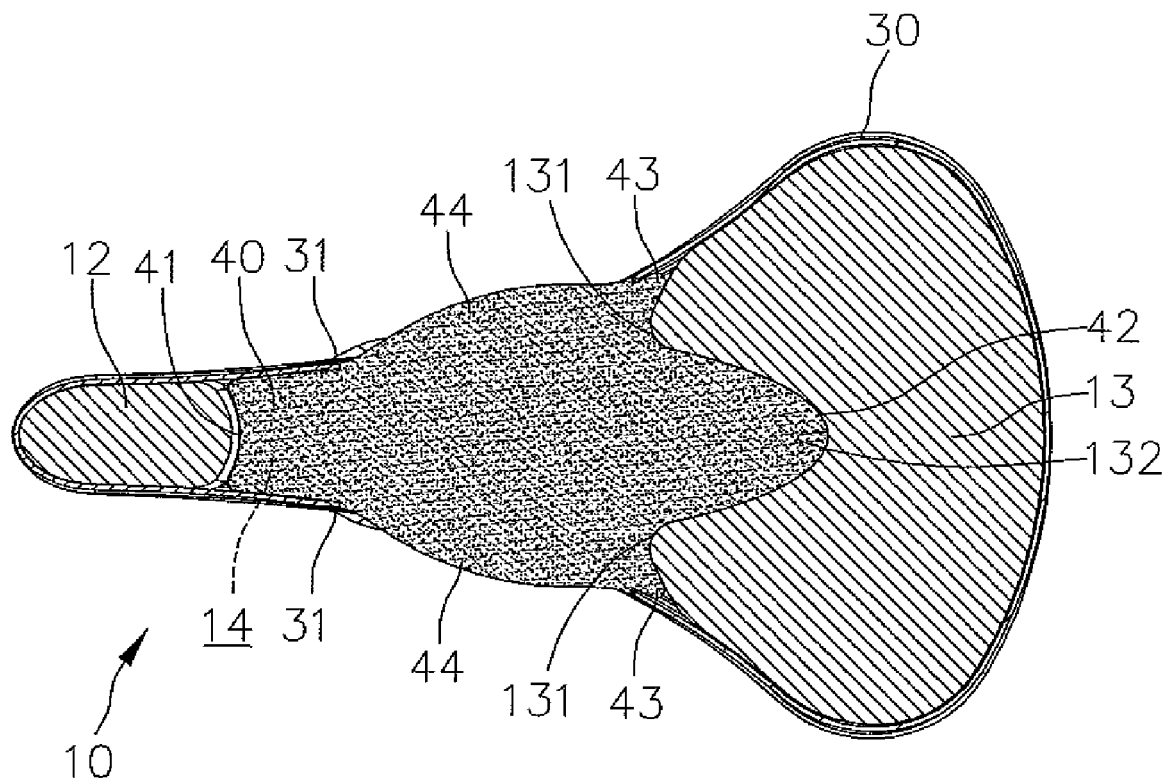
FIG. 13 is similar to FIG. 11, but with the bicycle saddle deforming elastically.

FIGS. 9 to 13 show a second embodiment of a bicycle saddle in accordance with the present invention. The bicycle saddle is similar to the prior embodiment, except that the elastic element 20 is substituted with an elastic element 40. The elastic element 40 includes a leading end portion 41 located against the first padding 12, a trailing end portion 42 located against the second curved portion 132, two side edges (not numbered) extending between the leading and trailing end portions 41, 42 and an extension 43 extending between the side edge and the trailing end portion 42. The elastic element 40 further has two protuberances 44 formed on two side edges respectively, with each protuberance 44 being received in the corresponding space 31 of the cover 30. As best seen in FIG. 13, the protuberances 44 are expandable outward of the space 31.

Preferably, the elastic element 40 is made from gel material, such as silica gel, or forming material which has a good cushioning property.

Also, in the second embodiment, the through hole 15 disposed on the frame 10 is omitted. The elastic element 40 does not have an air valve 25.

Figure 14:
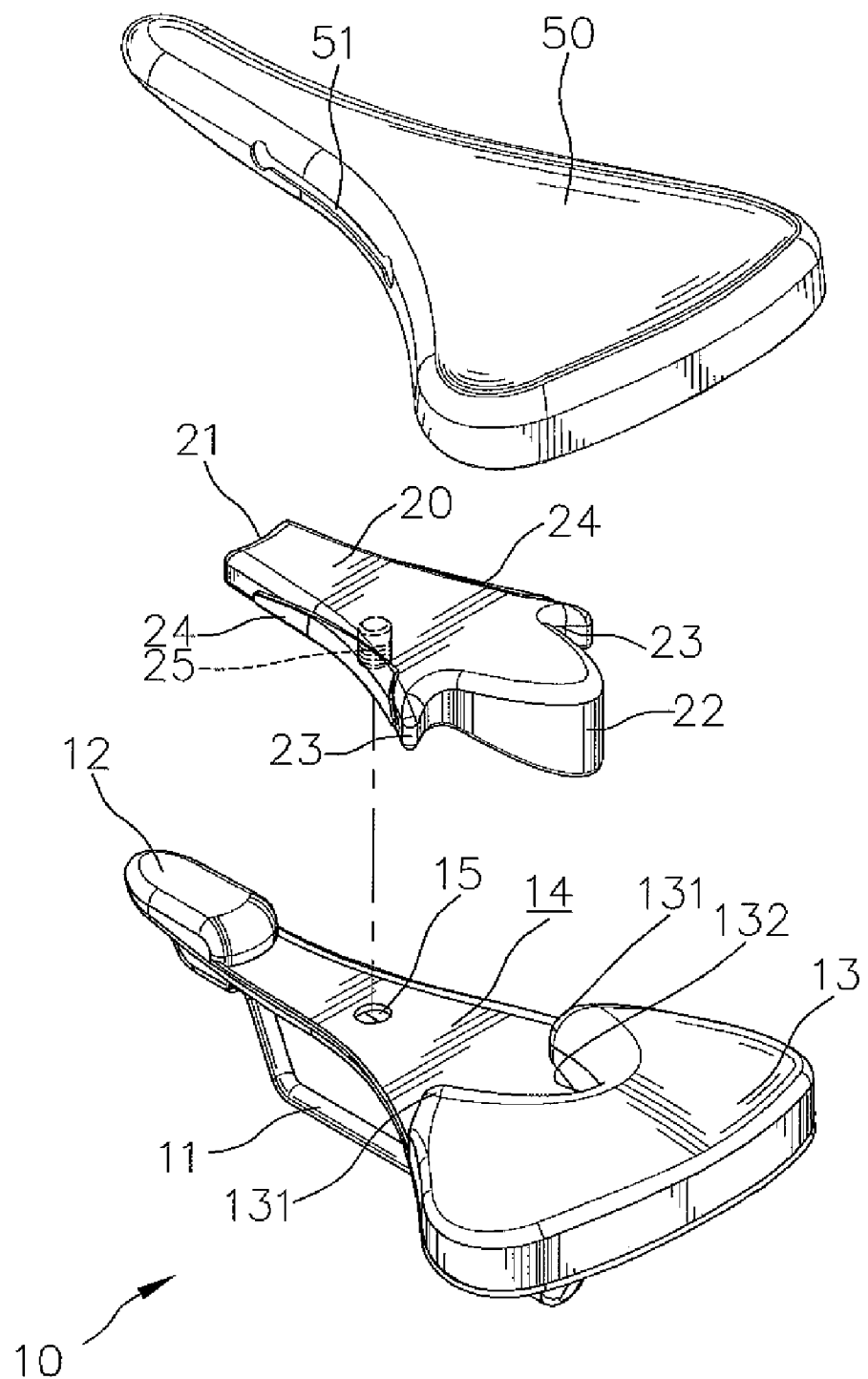
FIG. 14 is an exploded view of a bicycle saddle in accordance with a third embodiment of the present invention.
Figure 15:
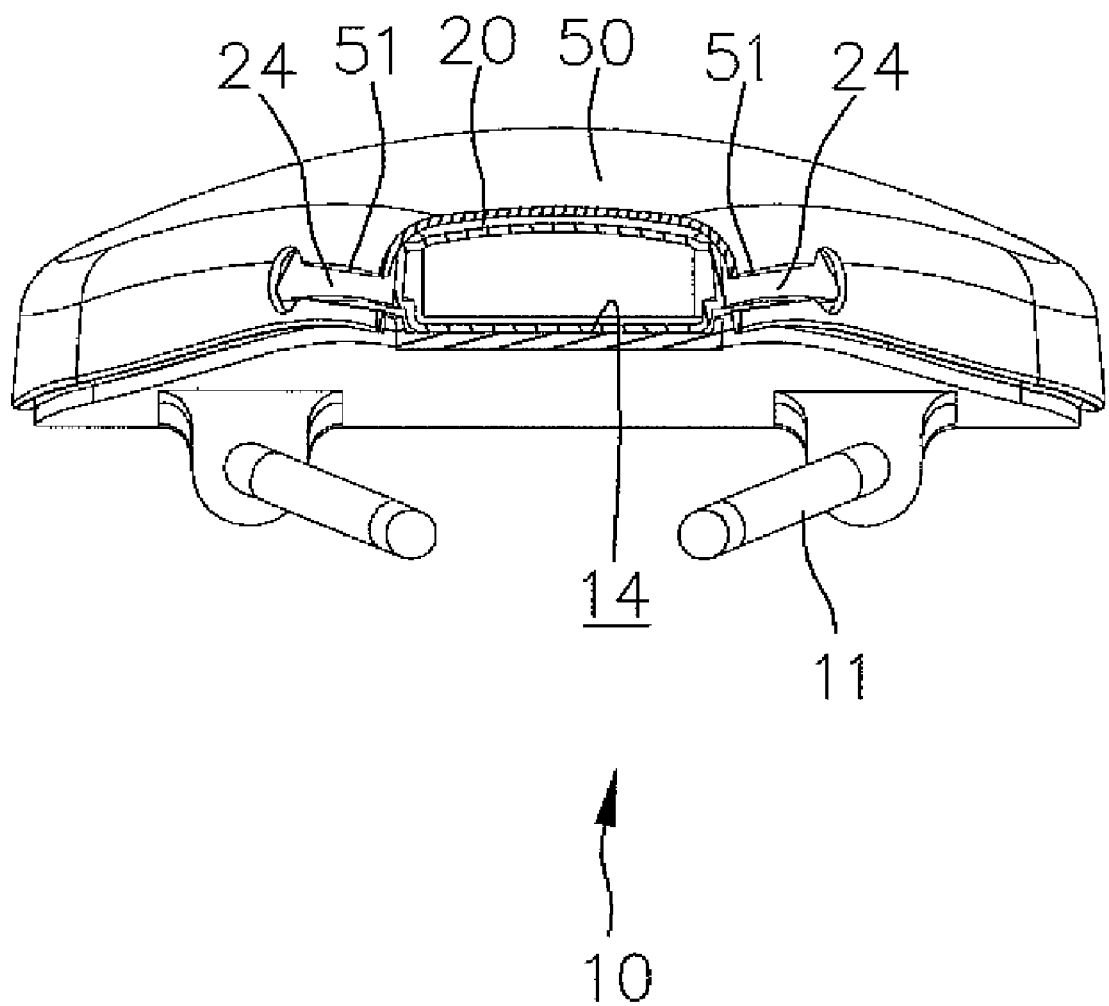
FIG. 15 is a rear view of the bicycle saddle of the third embodiment.

FIGS. 14 and 15 show a third embodiment of a bicycle saddle in accordance with the present invention. The bicycle saddle is similar to the first embodiment, except that the cover 30 is substituted with a cover 50. The cover 50 includes two spaces 51 which allow the respective protuberances 24 to extend outward therefrom.

Preferably, the space 51 is a hole and has a shape different to that of the protuberance 24. The space 51 includes a first circular area at a distal end, a second circular area at a proximal end, and a linear area formed between the first and second circular areas.

Figure 16:
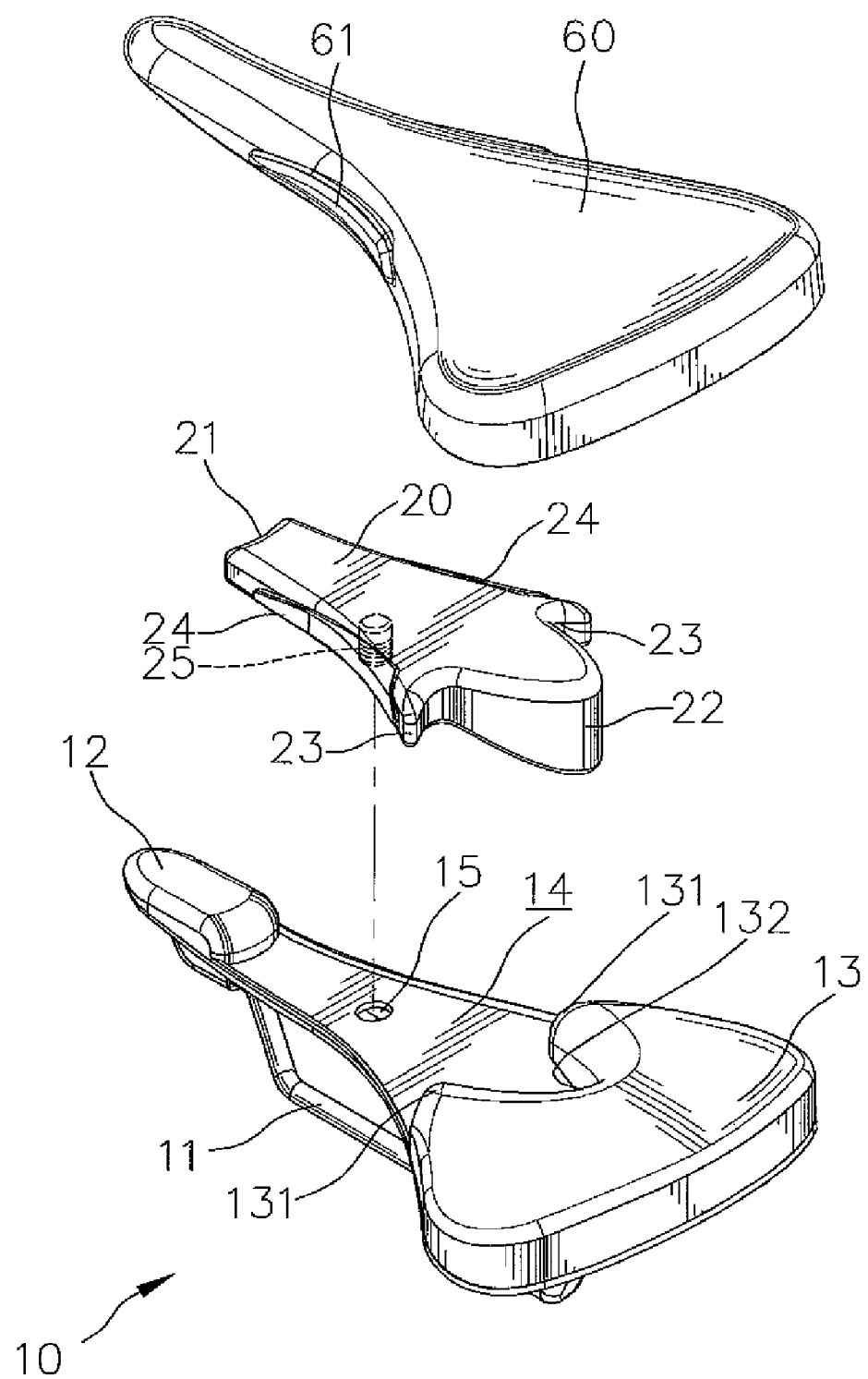
FIG. 16 is an exploded view of a bicycle saddle in accordance with a fourth embodiment of the present invention.
Figure 17:
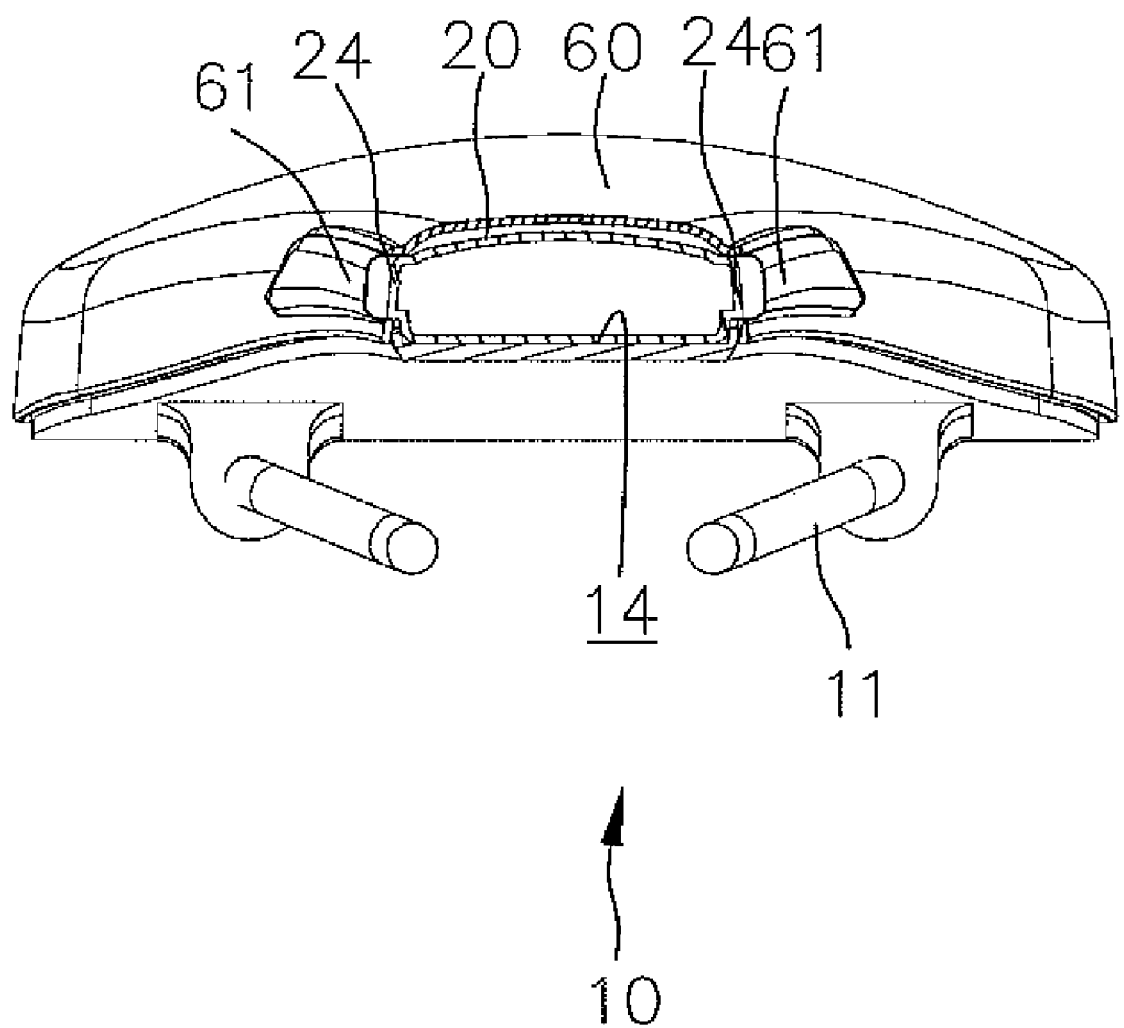
FIG. 17 is a rear view of the bicycle saddle of the fourth embodiment.

FIGS. 16 and 17 show a fourth embodiment of a bicycle saddle in accordance with the present invention. The bicycle saddle is similar to the first embodiment, except that the cover 30 is substituted with a cover 60. The cover 60 includes two spaces 61 which allow the respective protuberances 24 to extend outward therefrom.

Preferably, the space 61 is defined in a portion of the cover 60 which bulges outwards therefrom and is located corresponding to the protuberance 24.

Figure 18:
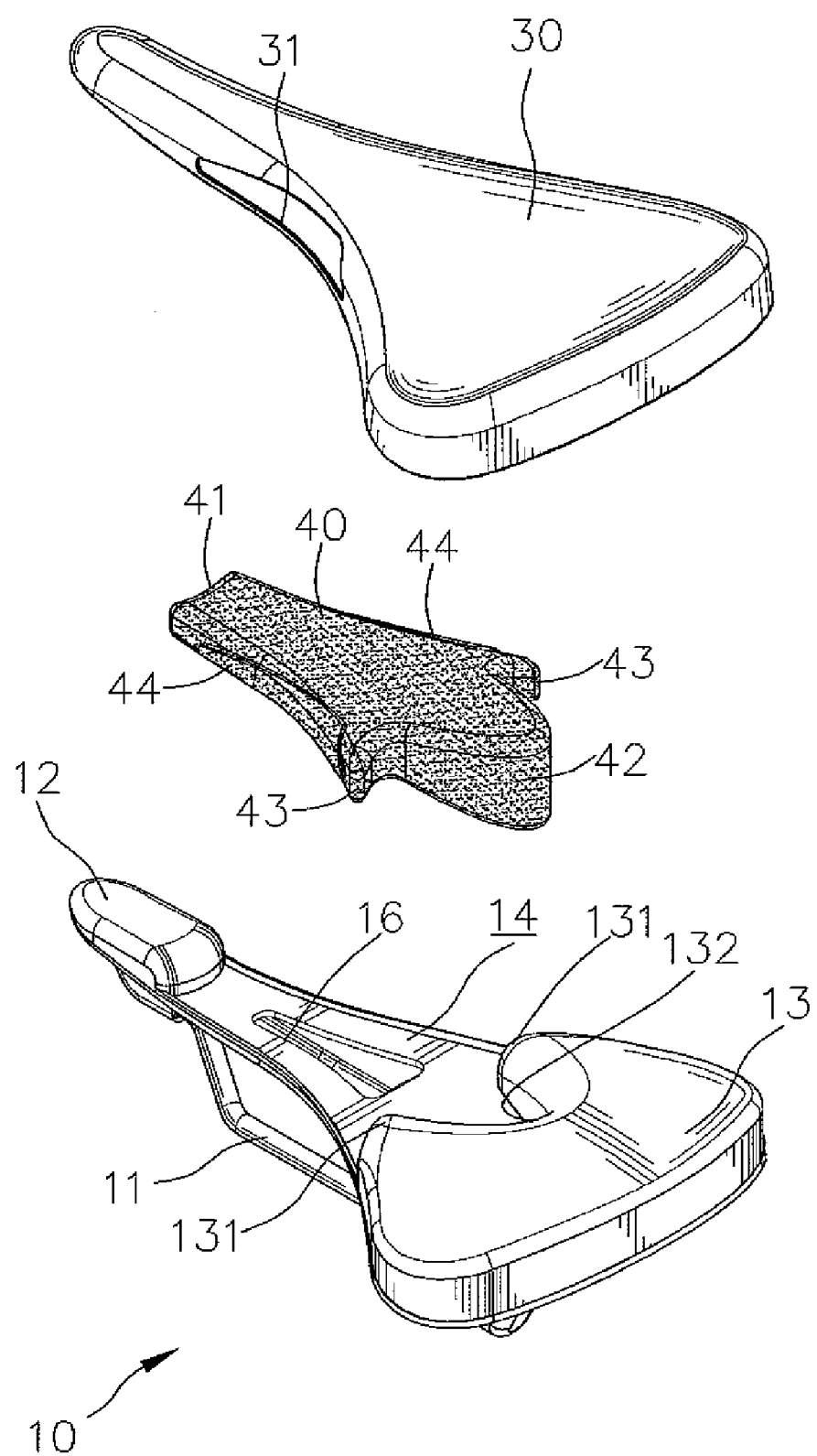
FIG. 18 is an exploded view of a bicycle saddle in accordance with a fifth embodiment of the present invention.

FIG. 18 shows a fifth embodiment of a bicycle saddle in accordance with the present invention. The bicycle saddle is similar to the second embodiment except that the frame 10 further has a wedge-shaped cutout 16 extending through the upper and under sides thereof and in communication with the compartment 14. The cutout 16 serves to allow extension of a portion of the elastic element 40 therethrough.

Figure 19:
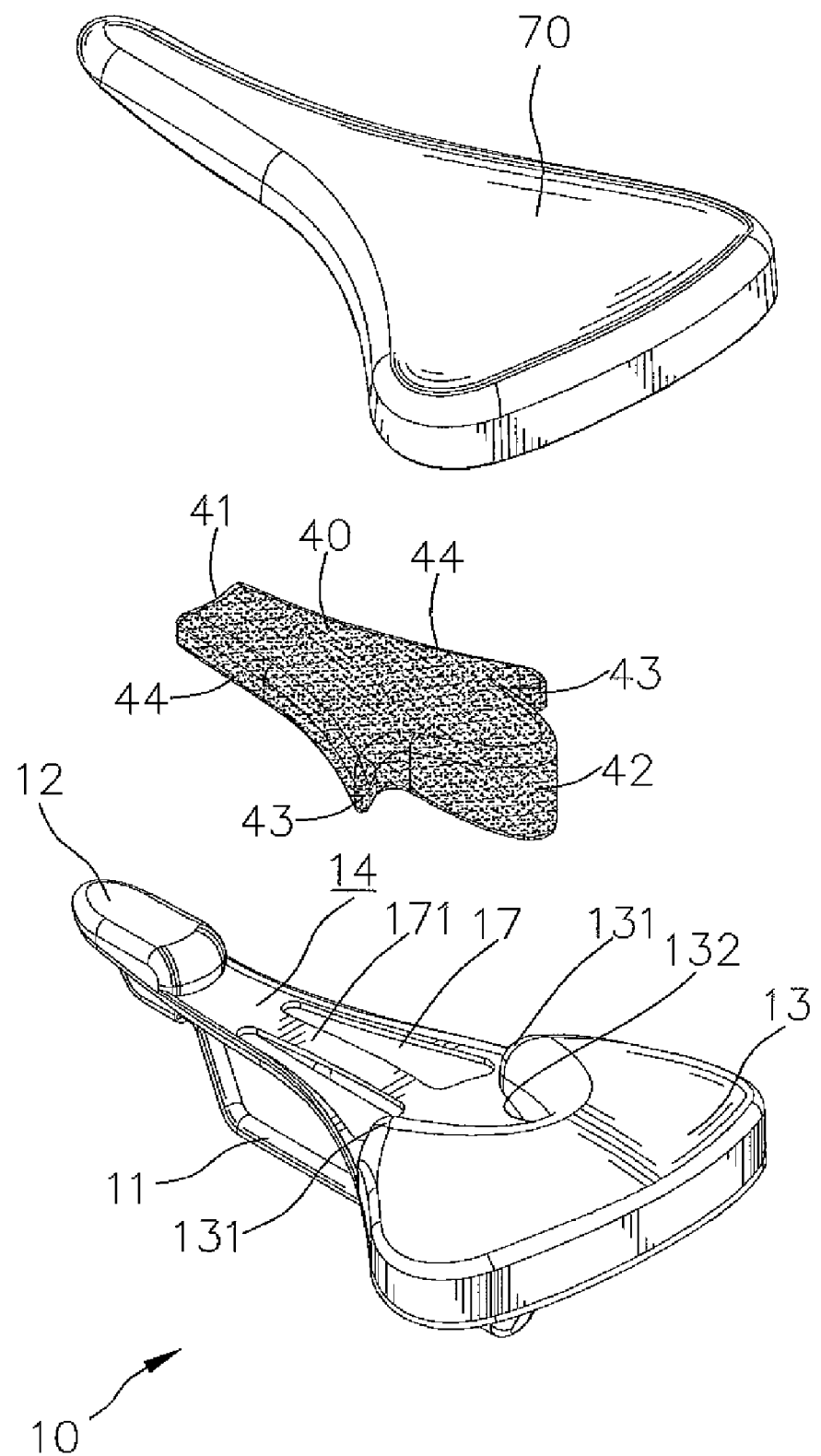
FIG. 19 is an exploded view of a bicycle saddle in accordance with a sixth embodiment of the present invention.

FIG. 19 shows a sixth embodiment of a bicycle saddle in accordance with the present invention. The bicycle saddle is similar to the fifth embodiment, except that the cover 30 is substituted with a cover 70. Also, the cutout 16 is substituted with two slots 17, with the slot 17 being mirroredly oriented with respect to a rib 171.

While the specific embodiments have been illustrated and described, numerous modifications come to mind without significantly departing from the spirit of invention and the scope of invention is only limited by the scope of accompanying claims.

What is claimed is:

1. A bicycle saddle comprising:
a frame including an upper side on which a first padding and a second padding are mounted, with the frame including an under side on which a suspension rail is mounted for mounting the bicycle saddle on a bicycle, with the first and second paddings including first and second padding edges, with the frame further including a compartment defined between the first and second paddings;
an elastic element received in the compartment, with the elastic element including first and second side edges; with the first side edge of the elastic element extending between the first padding edges of the first and second paddings, with the second side edge of the elastic element extending between the second padding edges of the first and second paddings; and
a cover snugly fitted over the first and second paddings and the elastic element and the first and second adding edges and the first and second side edges, with the cover including two spaces;
whereby when a rider's pelvis bears on the bicycle saddle, the first and second sides edges of the elastic element extend outward of the two spaces respectively for reducing pressure against the rider's pelvis.

2. The bicycle saddle as claimed in claim 1 wherein the elastic element comprises two protuberances formed on the first and second side edges thereof respectively, with each protuberances received in the respective space of the two spaces, whereby when a rider's pelvis bears on the bicycle saddle, the two protuberances extend outward of the two spaces respectively for reducing pressure against the rider's pelvis.

3. The bicycle saddle as claimed in claim 2 wherein each space has a shape the same as that of the protuberance.

4. The bicycle saddle as claimed in claim 1 wherein each space has a shape having a first circular area at a distal end, a second circular area at a proximal end, and a linear area formed between the first and second circular areas.

5. The bicycle saddle as claimed in claim 1 wherein each space is defined in a portion of the cover which bulges outwards therefrom.

6. The bicycle saddle as claimed in claim 1 wherein the frame comprises a through hole, and wherein the elastic element comprises an air valve attached thereto for modifying the cushioning property of the elastic element, and wherein the air valve is insertable into the through hole.

7. The bicycle saddle as claimed in claim 1 wherein the elastic element is made from gel material.

8. The bicycle saddle as claimed in claim 1 wherein the elastic element is made of forming material.

9. The bicycle saddle as claimed in claim 1 wherein the frame comprises a cutout in communication with the compartment, with the cutout allowing the elastic element to extend outward therefrom.

10. A bicycle saddle comprising:
   a frame including an upper side on which a first padding and a second padding are mounted, with the frame including an under side on which a suspension rail is mounted for mounting the bicycle saddle on a bicycle, with the first and second paddings including first and second padding edges, with the frame further including a compartment defined between the first and second paddings, with the frame further including at least two slots;
   an elastic element received in the compartment, with the elastic element including first and second side edges; with the first side edge of the elastic element extending between the first edges of the first and second paddings, with the second side edge of the elastic element extending between the second padding edges of the first and second paddings; and
   a cover snugly fitted over the first and second paddings and the elastic element and the first and second padding edges and the first and second side edges;
   whereby when a rider's pelvis bears on the bicycle saddle, the first and second sides edges of the elastic element extend outward of the at least two slots for reducing pressure against the rider's pelvis.

11. The bicycle saddle as claimed in claim 10 wherein the frame further comprises a rib separating the at least two slots.

* * * * *